May 4, 1948.  C. R. FOUNTAIN  2,440,679
VOLTAGE MEASURING DEVICE
Filed Oct. 16, 1945
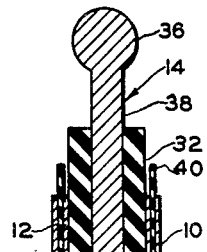
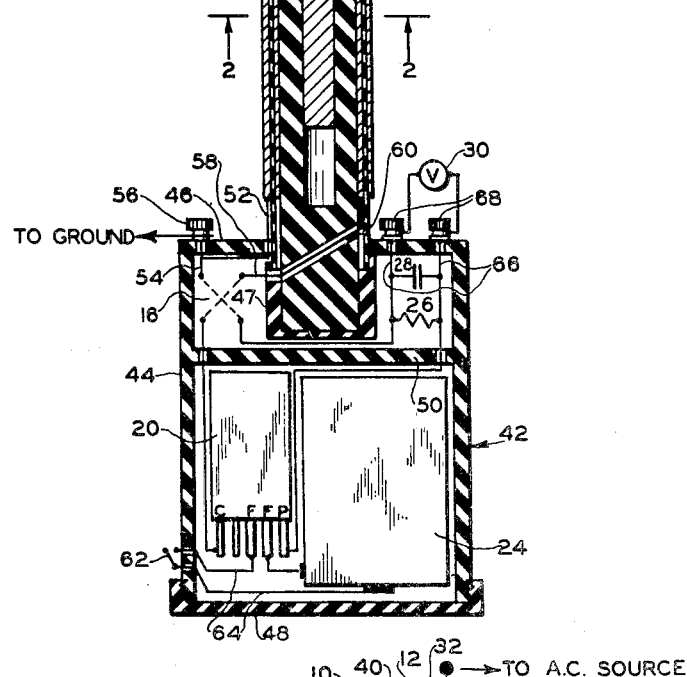
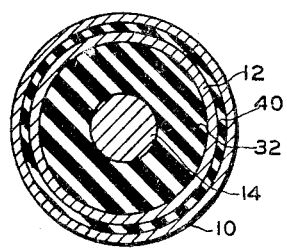
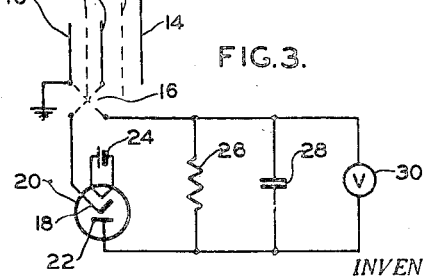
INVENTOR.
CLAUDE R. FOUNTAIN
BY
William D. Hall,
Attorney Patented May 4, 1948

2,440,679

UNITED STATES PATENT OFFICE 2,440,679

VOLTAGE MEASURING DEVICE

Claude R. Fountain, Spring Lake, N. J., assignor to the United States of America as represented by the Secretary of War Application October 16, 1945, Serial No. 622,648

4 Claims. (Cl. 171—95)

(Granted under the act of March 3, 1883, as amended April 30, 1928; 370 O. G. 757)

The invention described herein may be manufactured and used by or for the Government for governmental purposes, without the payment to me of any royalty thereon.

The invention relates to voltage measuring devices and more particularly to such devices of the voltage reduction type.

It is frequently necessary to measure voltages of extremely high potential. Measurement of such voltages is inherently dangerous, and it is therefore a primary object of the invention to provide a means whereby the danger to personnel measuring voltages of high potential may be obviated.

It is a further object of the invention to provide a means whereby peak voltages may be measured.

These objects, together with other objects and advantages which will be apparent from the following description of a device embodying the invention, are achieved, in a preferred embodiment of the invention, by means of a voltage gradient system positioned about a rod that is designed to make contact with the voltage source to be measured. The voltage gradient system includes a pair of concentric cylindrical capacitor plates coaxial with the contact rod, together with a suitable circuit for measuring the voltage developed across the capacitor. The size and spacing of the cylinder plates, both in relation to each other and in relation to the contact rod, are predetermined, whereby the voltage on the rod may be readily determined from the substantially lower voltage appearing across the capacitor.

A better understanding of the invention may be obtained from the following description of a device embodying the invention, the said description to be read in connection with the following drawings, in which, Figure 1 is a longitudinal section of a device embodying the invention, some of the circuit elements disclosed thereby being shown schematically, and Figure 2 is an enlarged section along line 2—2 of Figure 1, and Figure 3 is a schematic electrical diagram of the device shown in Figure 1.

Referring to the drawings, and particularly to Figure 3 wherein is shown a schematic drawing of the electrical circuit of the device shown in Figure 1, a pair of capacitor plates 10 and 12 are positioned in spaced relationship to a contact rod 14. The outer plate 10 is at ground potential and the plates 10 and 12 are connected to an external measuring circuit through a reversing switch 16. The inner plate 12 is connected through the switch 16 to the filament 18 of a diode 20, the filament 18 being provided with a heater circuit, which circuit includes a battery 24. The diode 20 also includes an anode 22.

The remaining elements of the measuring circuit, comprising a leakage resistor 26, a charging capacitor 28 and an electrostatic voltmeter 30, in parallel arrangement with one another, are bridged across the anode 22 and the outer plate 10 through the switch 16.

From a consideration of the foregoing circuit, it will be apparent that an alternating voltage impressed on the rod 14 will be reflected in a potential gradient across the plates 10 and 12, which potential may be measured by a voltmeter 30. Since the voltage appearing across the plates 10 and 12 bears a predetermined ratio to the unknown voltage impressed on the rod 14, the said unknown voltage may be readily determined.

The invention having thus been explained in reference to its electrical circuit, reference is now made to Figures 1 and 2, wherein are shown two views of a device embodying the invention.

A cylinder 32, formed of a dielectric material and provided along the greater part of its length with an axial bore, serves as a support for the contact rod 14 and the plates 10 and 12, and also serves as a dielectric shield between said rod and said plates.

The rod 14, formed of conductive material, comprises a bulb portion 36, whereby electrical contact may be readily made with the source of potential to be measured, and a cylindrical body portion 38, whereby the rod may be adjustably positioned along the length of the bore of the cylinder 32. The plates 10 and 12, tubular in form, are coaxial with the cylinder 32, and are spaced from each other by a dielectric tube 40. In order to reduce leakage between the rod 14 and the plates 10 and 12 to a minimum, the plates 10 and 12 are terminated a short distance below the upper end of the dielectric cylinder 32. Similarly, to reduce leakage between the plate 10 and the plate 12 to a minimum, the dielectric tube 40 extends a short distance beyond the upper and lower ends of said plates.

The aforementioned reversing switch 16, diode 20 with its associated battery 24, resistor 26 and capacitor 28 are positioned within a compartment 42, the said compartment being formed of a dielectric material. The compartment 42 comprises a tubular portion 44 closed at one end by a recessed wall 46 and closed at the other end by a cap 48 threadably coupled thereto. The wall 46 is provided with a centrally disposed recess 47 having its lower portion complementary in diameter to the diameter of the cylinder 32, whereby the said cylinder may be firmly fixed in position. The upper portion of the said recess is of a slightly greater diameter than its lower portion, whereby the dielectric tube 40 may also be seated in said recess. The said recess 47 is here shown as a separate member, but it may be formed integral with the wall 46 if desired. The wall 46 and the tubular portion 42 are apertured, whereby electrical connection may be made to, and electrical control may be obtained over, the circuit elements positioned within the compartment 42. The said apertured portions are provided with suitable binding posts or other terminal equipment, as will be described hereinbelow.

The reversing switch 16, the terminals only of which are shown, the resistor 26 and the capacitor 28 are positioned in the upper portion of the compartment 42, and the diode 20, together with its associated battery 24, are positioned in the lower portion of the compartment, the two said portions being delineated by a disc 50 of dielectric material. The outside diameter of the disc 50 is of lesser diameter than the internal diameter of the compartment 42, whereby connector leads may pass from one portion to the other.

Electrical connection is made between the outer plate 10 and the reversing switch 16 by means of the connector 52. Since the outer plate 10 is to be grounded, a lead 54 is run to a binding post 56 from the terminal of the reversing switch 16 to which the conductor 52 is connected.

The inner plate 12 is connected to the reversing switch 16 by means of a conductor 58, the said conductor being passed through a channel 60 in cylinder 32. The channel 60 is formed at a small angle with a horizontal, whereby one end of the channel opens at a point above the wall 46 and the other end of the channel opens into the compartment 42.

In order that the battery 24 may be disconnected from the circuit when the invention is not in use, a switch 62 is incorporated into the battery circuit. The switch 62 is positioned on the external surface of the compartment 42, suitable lead wires 64 being provided.

Inasmuch as the device herein disclosed is adapted to be used in a variety of positions, it is deemed advisable that the voltmeter 30 be detachable from the device. Therefore leads 66 are run from the parallel circuit comprising the resistance 26 and the capacitor 28 to the binding posts 68, across which the voltmeter 30 may be connected.

There has thus been provided a device adapted to quickly and safely measure high voltages. A wide voltage range is readily obtainable by varying the position of the contact rod 14 in the bore of the cylinder 32, thereby varying the capacity between the rod 14 and the plate 12. The device may be built to incorporate any desired voltage reduction, the gradient depending upon the relative spacing of the rod 14 and the plates 10 and 12. Due both to the voltage reduction and to the fact that the compartment 42 is made of dielectric material, thereby insulating the operator from the circuit, the danger inherent in high voltage measurements is obviated.

The device further is well adapted to measure substantially peak voltages. Successive pulses appear across charging capacitor 28 and, if said condenser is very small, the approximately peak voltage may be read on the electrostatic voltmeter 30. The reversing switch 16 is provided so that both positive and negative portions of the voltage cycle may be introduced into the measuring circuit.

It will be obvious that many modifications and changes of the invention disclosed herein are possible and within the spirit of the invention as defined by the attached claims. It is therefore intended that the foregoing description constitute a disclosure of a presently preferred embodiment of the invention, and that the invention be understood to be fully defined by the following claims.

What is claimed is:

1. A system for determining the voltage of a source by measuring a predetermined ratio of the said voltage, comprising a contact rod adapted to electrically engage said source, a pair of cylindrical capacitor plates coaxial with the said rod and spaced from said rod and from each other a predetermined distance, the outer of said plates being at ground potential, means to move said rod axially relative to said plates, and means for measuring the resultant reduced voltage appearing across the said plates.

2. A system for determining the voltage of a source by measuring a predetermined ratio of the said voltage, comprising a contact rod adapted to electrically engage said source, a pair of cylindrical capacitor plates coaxial with the said rod and spaced from the said rod and from each other a predetermined distance, the outer of said plates being at ground potential, means to move said rod axially relative to said plates, and measuring means comprising a diode having its filament connected to one of the aforesaid capacitor plates, a parallel resistance-capacitance arrangement having one of its terminals connected to the anode of the said diode and having the other of its terminals connected to the other of the said capacitor plates, the said plate being at ground potential as aforesaid, and a voltmeter connected across the aforesaid resistance-capacitance arrangement, whereby the rectified voltage may be measured.

3. The device as set forth in claim 2, including a reversing switch connected between said capacitor plates and said measuring means whereby either positive or negative voltages may be introduced into said measuring means.

4. A device of the character described comprising a cylinder of dielectric material having an axial bore along part of its length, a contact rod adjustably positioned in said bore, a pair of spaced cylindrical capacitor plates disposed about said cylinder and coaxial therewith, the outermost of said plates being at ground potential, a tube of dielectric material positioned between said plates, a closed compartment of dielectric material fixed to the said cylinder, a measuring circuit positioned within said compartment and connected to said capacitor plates through a reversing switch, the said measuring circuit including a rectifier element having its output connected to a parallel resistance-capacitance network and means whereby a voltmeter may be introduced across said network whereby the voltage impressed thereon may be measured.

CLAUDE R. FOUNTAIN.

REFERENCES CITED

The following references are of record in the file of this patent:

UNITED STATES PATENTS

| Number | Name | Date |
| --- | --- | --- |
| 1,602,882 | Chubb | Oct. 12, 1926 |
| 1,810,063 | Thomas | June 16, 1931 |
| 2,036,084 | Roder | Nov. 31, 1936 |
| 2,309,560 | Welty | Jan. 26, 1943 |
| 2,356,733 | Banker | Aug. 29, 1944 |